United States Patent [19]

Barrus et al.

[11] 4,359,289
[45] Nov. 16, 1982

[54] COUNTERBALANCED BIDIRECTIONAL SHUTTLE DRIVE HAVING LINEAR MOTOR

[75] Inventors: Gordon B. Barrus, El Segundo; Jerry Matula, Westminster, both of Calif.

[73] Assignee: Printronix, Inc., Irvine, Calif.

[21] Appl. No.: 96,025

[22] Filed: Nov. 20, 1979

[51] Int. Cl.³ .............................................. B41J 19/00
[52] U.S. Cl. .................................. 400/322; 400/341; 400/686; 101/93.04; 310/12; 318/135
[58] Field of Search .............. 400/320, 322, 323, 341, 400/686; 101/93.04, 93.05, 93.15, 93.16; 310/12, 13, 14; 318/128, 135

[56] References Cited

U.S. PATENT DOCUMENTS

| | | | |
|---|---|---|---|
| 2,337,430 | 12/1943 | Trombetta | 310/13 |
| 3,109,113 | 10/1963 | Henry-Baudot | 310/13 |
| 3,618,514 | 11/1971 | Nyman et al. | 400/322 X |
| 3,941,051 | 3/1976 | Barrus et al. | 101/93.04 |
| 4,149,808 | 4/1979 | Matthias et al. | 400/322 |
| 4,151,447 | 4/1979 | von der Heide et al. | 318/135 |
| 4,180,766 | 12/1979 | Matula | 318/128 |
| 4,187,453 | 2/1980 | Rough | 318/135 |
| 4,239,403 | 12/1980 | Matula et al. | 400/322 |

FOREIGN PATENT DOCUMENTS

| | | | |
|---|---|---|---|
| 98445 | 11/1924 | Fed. Rep. of Germany | 400/341 |
| 88968 | 8/1958 | Netherlands | 400/341 |

*Primary Examiner*—Ernest T. Wright, Jr.
*Attorney, Agent, or Firm*—Fraser & Bogucki

[57] ABSTRACT

An arrangement for bidirectionally driving a hammer bank shuttle assembly along a linear path in a line printer includes an opposite pair of circular, rotatable elements having an elongated shuttle assembly mounting element and an elongated counterbalancing element extending between the pair of rotatable elements on the opposite sides thereof. Pole pieces and a magnet disposed between and adjacent the shuttle assembly mounting element and the counterbalancing element provide magnetic flux which flows through portions of the opposite elements to attract and maintain the elements in contact with the opposite rotatable elements. A pair of serially coupled coils mounted on the counterbalancing element and disposed within the air gaps formed by the pole pieces and the magnet are energized by a cyclically varying signal to bidirectionally drive the shuttle assembly mounting element and its included hammer bank shuttle assembly along the linear path as the counterbalancing element is caused to reciprocate between opposite limits of movement defined by an opposite pair of resilient elements in the path of movement of the counterbalancing element. In an alternative embodiment the coils are disposed between the counterbalancing element and the shuttle assembly mounting element so as to form air gaps with and magnetically interact with a first pair of magnets mounted in spaced-apart relation along the length of the counterbalancing element and a second pair of magnets mounted in spaced-apart relation along the length of the shuttle assembly mounting element.

23 Claims, 13 Drawing Figures

COUNTERBALANCED BIDIRECTIONAL SHUTTLE DRIVE HAVING LINEAR MOTOR

BACKGROUND OF THE INVENTION

1. Field of the Invention

The present invention relates to arrangements for driving a member in bidirectional fashion along a linear path, and more particularly to arrangements for reciprocating a shuttle assembly adjacent print paper in a line printer.

2. History of the Prior Art

It is known to provide a line printer in which a shuttle assembly including a hammer bank is driven in reciprocating, bidirectional fashion along a linear path adjacent a platen-supported ribbon and print paper or other printable medium as the individual hammers of the hammer bank are actuated so as to impact the printable medium and effect the desired printing. An example of such an arrangement is provided by U.S. Pat. No. 3,941,051 of Barrus et al, issued Mar. 2, 1976 and commonly assigned with the present application. The arrangement shown in the Barrus et al patent drives the shuttle assembly using a counterbalanced, cam controlled positive drive mechanism.

In the driving arrangement shown in the Barrus et al patent, the controlling cam surfaces must be precisely generated for the desired essentially trapezoidal velocity function, although substantial wear can have an adverse effect on the nature of the motion. With such an arrangement, a large drive motor and flywheel are desirable for velocity stability, and there are practical limitations on the shuttle rate that can be achieved.

An alternative arrangement which avoids some of the problems present in the system of the Barrus et al patent and which provides certain other advantages is shown in a co-pending application of Jerry Matula, Ser. No. 765,873, filed Feb. 4, 1977, now U.S. Pat. No. 4,180,766 issued Dec. 25, 1979, and commonly assigned with the present application. The printer disclosed in the Matula patent drives the shuttle assembly using a linear motor. The linear motor includes a coil coupled for linear movement in conjunction with the shuttle assembly and a surrounding permanent magnet. The coil is bidirectionally energized by a circuit which is sensitive to movement of the shuttle assembly between opposite limits and which energizes the coil in accordance with the difference between the actual and the desired velocity of the shuttle assembly. The coil energizing circuit saturates whenever the actual velocity of the shuttle assembly falls below a minimum value to provide a large driving current to the coil following reversals in direction and at any other time that high energization of the coil may be needed. For the most part, however, resilient stop elements provide substantial rebounding force on change in direction so that servo control may be employed to provide the small amount of energizing current necessary to maintain the shuttle assembly at a nominal velocity. Other examples of linear motor arrangements used in printers and other peripheral equipment are provided by U.S. Pat. No. 4,149,808 of Matthias et al issued Apr. 17, 1979 and U.S. Pat. No. 4,151,447 of von der Heide et al, issued Apr. 24, 1979.

An alternative arrangement for bidirectionally driving a shuttle assembly is shown in a co-pending application of Jerry Matula et al, Ser. No. 7,789, filed Jan. 30, 1979, now U.S. Pat. No. 4,239,403 issued Dec. 16, 1980, and commonly assigned with the present application. The arrangement shown in the Matula et al patent substantially reduces or eliminates shaking and other vibratory motion which can result from reciprocating movement by using a counterbalance arrangement in which an elongated counterbalancing bar extending between an opposite pair of rotatable pulleys on one side of the pulleys counterbalances a hammer bank shuttle assembly mounting member of similar mass extending between the opposite pair of rotatable pulleys on the opposite side thereof from the counterbalancing bar. The shuttle assembly mounting element and the counterbalancing bar which are attached to a band formed into an endless loop encircling the opposite rotatable pulleys are held in position against the pulleys by a magnet assembly extending between the mounting element and the counterbalancing bar in the region between the opposite rotatable pulleys. The mounting element and included hammer bank shuttle assembly are bidirectionally driven between opposite limits of movement defined by engagement of a block on the outside of the counterbalancing bar with either of an opposite pair of springs by a DC motor coupled through a belt and pulley arrangement to one of the rotatable pulleys. The DC motor is bidirectionally driven by a current having a polarity which reverses with the opposite reversals in direction of the shuttle assembly and which is momentarily of large value such as during reversals in the shuttle assembly and otherwise of a relatively small value required to servo the shuttle assembly at a desired nominal velocity.

The arrangement shown in Matula et al U.S. Pat. No. 4,239,403 is advantageous in a number of respects, and particularly with respect to the substantial reduction or elimination of vibration and other undesired motion due to the counterbalancing of the arrangement. However, there may be instances where alternative arrangements for driving the counterbalanced mechanism are desired. The belt and pulley couplings between the DC drive motor and the driven one of the opposite rotatable pulleys can introduce substantial friction. The DC motor itself can introduce substantial friction. Moreover, there can be significant thrust loads on the bearings of the motor and the bearings of the shaft mounting the driven pulley because of belt tension. A still further problem may arise in connection with commutation of the motor. Because of the relatively short rotational stroke of the motor between opposite limits of movement of the counterbalanced arrangement, the brush commutator of the motor may wear excessively rapidly in certain applications.

Accordingly, it would be desirable to provide an alternative arrangement for bidirectionally driving a counterbalanced hammer bank shuttle drive. It would furthermore be desirable to provide a driving arrangement which is relatively simple in design and which shares parts with an arrangement for magnetically holding the shuttle assembly mounting element and the counterbalancing bar against the pulleys. It would still furthermore be advantageous to provide a driving arrangement which is of relatively low friction and which is capable of maintaining the hammer bank shuttle assembly at a desired nominal velocity using a minimum of drive current.

BRIEF SUMMARY OF THE INVENTION

These and other objects in accordance with the invention are accomplished by a counterbalanced bidirectional shuttle drive which utilizes a linear motor arrangement for the driving thereof. An arrangement of pole pieces and a magnet disposed adjacent an elongated hammer bank shuttle assembly mounting element and a counterbalancing bar disposed on the opposite sides of and extending between the opposite ones of a pair of rotatable pulleys provides a flow of magnetic flux through portions of the mounting element and counterbalancing bar to attract the mounting element and counterbalancing bar inwardly and maintain them in contact with the opposite pulleys. The magnetic flux is also utilized by a linear motor arrangement which includes at least one coil mounted on the mounting element or the counterbalancing bar within one of the air gaps in the magnetic flux path. Energization of the coil using a signal of alternating polarity bidirectionally drives the mounting element and the counterbalancing bar to reciprocate the mounting element and included hammer bank shuttle assembly along a path of linear motion between opposite limits defined by a resilient arrangement.

In a preferred embodiment of a counterbalanced bidirectional shuttle drive in accordance with the invention, the opposite mounting element and counterbalancing bar are held in position against the opposite rotatable pulleys by a pair of spaced-apart pole pieces disposed between the opposite pulleys so as to extend into the region of and form air gaps with the mounting element. A permanent magnet at the end of one of the pole pieces forms an air gap with the counterbalancing bar. The other pole piece forms an air gap with the counterbalancing bar. The resulting arrangement causes magnetic flux to flow from the magnet through the pole pieces and adjacent portions of the mounting element and counterbalancing bar so as to pull the mounting element and the counterbalancing bar toward one another and against the rotatable pulleys. At the same time, a linear motor is provided by a pair of coils mounted on the counterbalancing bar and serially coupled to each other across a source of cyclically varying current. Application of the current to the coils causes the coils to interact with the magnetic flux within the gaps formed by the magnet and in which the coils are disposed, thereby forcing the counterbalancing bar to undergo bidirectional linear motion between opposite limits of movement defined by a pair of opposite resilient elements mounted adjacent the opposite ends of the counterbalancing bar. A flexible band extends around portions of the opposite pulleys and is secured to the mounting element and counterbalancing bar to assist in holding the mounting element and counterbalancing bar in position against the pulleys and to enhance the linear movement of the mounting element and counterbalancing bar as the opposite pulleys rotate.

In one alternative arrangement of a counterbalanced bidirectional shuttle drive in accordance with the invention, a magnet is mounted on one of the two pole pieces disposed between the mounting element and the counterbalancing bar, and a third pole piece is mounted on the opposite side of the counterbalancing bar from the first and second pole pieces so as to form an air gap with the counterbalancing bar opposite the second pole piece. The opposite end of the third pole piece includes a second magnet forming an air gap with the counterbalancing bar opposite the air gap formed by the magnet at the end of the first pole piece. This arrangement provides some improvement in efficiency by utilizing both sides of the counterbalancing bar mounted coils at the expense of some loss in the attractive force exerted on the mounting element and counterbalancing bar toward the pulleys due to the presence of air gaps on both sides of the counterbalancing bar. A compromise between improved coil efficiency and loss in magnetic attraction on the mounting element and counterbalancing bar can be reached by making the air gaps on the outside of the counterbalancing bar and adjacent the third pole piece and second magnet larger than the air gaps on the inside of the counterbalancing bar formed by the first and second pole pieces and the first magnet.

In a further alternative arrangement in accordance with the invention a band is used which has an integral central portion and a pair of end portions at the opposite ends of the central portion. The central portion of the band extends around and is attached to one of the opposite pulleys at a fixed point as well as being attached at fixed points to the opposite mounting element and counterbalancing bar. The opposite end portions of the band extend from the points of fixed attachment on the mounting element and counterbalancing bar around the opposite one of the pair of pulleys where they are secured in place adjacent a resilient element. The resilient element which provides band tension protrudes from the pulley and has one of the end portions of the band residing thereover. By securing the central portion of the band to the first one of the pulleys and the mounting element and counterbalancing bar and by disposing a single mount with opposite resilient elements adjacent the same pulley for alternate impacting by adjacent ends of the mounting element and counterbalancing bar, the central portion of the band is always maintained in tension and is isolated from the remainder of the band to compensate for dimensional variations due to tolerances, thermal variations and like factors.

In a still further alternative arrangement in accordance with the invention a pair of coils is mounted between a counterbalancing bar and an opposite mounting element so as to interact with opposite pairs of permanent magnets. A first pair of the permanent magnets is mounted in spaced-apart relation along the length of the counterbalancing bar so as to be disposed adjacent and form air gaps with the pair of coils. A second pair of permanent magnets is mounted in spaced-apart relation along the length of the mounting element so as to be disposed adjacent and form air gaps with the pair of coils. Each of the pair of coils is comprised of a length of wire wound around the outside of a form so as to dispose opposite portions of each turn of the wire in the air gaps adjacent the permanent magnets to enhance the efficiency of operation.

BRIEF DESCRIPTION OF THE DRAWING

The foregoing and other objects, features and advantages of the invention will be apparent from the following more particular description of preferred embodiments of the invention, as illustrated in the accompanying drawing, in which.

DETAILED DESCRIPTION

Figures 1, 1A, 1B:
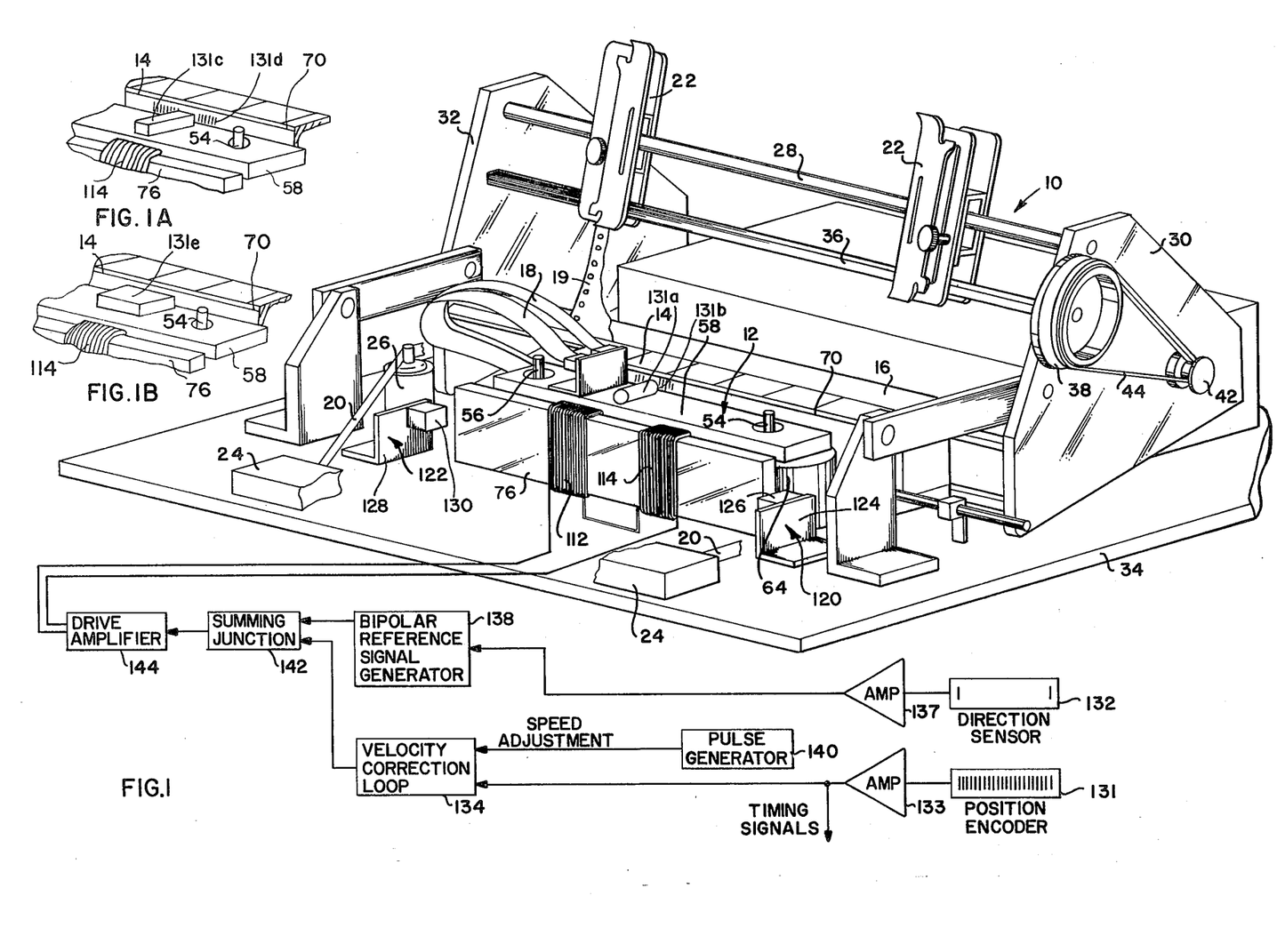
FIG. 1 is a perspective view of a printer employing a counterbalanced bidirectional shuttle drive with linear motor in accordance with the invention and a block diagram of a circuit for controlling the shuttle drive.
FIG. 1A is a perspective view of a portion of the printer of FIG. 1 depicting an alternative arrangement for the position encoder.
FIG. 1B is a perspective view of a portion of the printer of FIG. 1 depicting a further alternative arrangement for the position encoder.

FIG. 1 depicts a printer 10 which includes a counterbalanced bidirectional shuttle drive 12 in accordance with the invention. The shuttle drive 12 reciprocates a shuttle assembly 14 relative to an adjacent platen 16. The shuttle assembly 14 may assume the configuration of the shuttle assembly shown in previously referred to U.S. Pat. No. 3,941,051 of Barrus et al, or other appropriate configuration. A wire bus 18 is coupled to the shuttle assembly 14 to provide electrical interconnection therewith. The shuttle assembly 14 selectively impacts and thereby imprints on a print paper 19 via an ink ribbon 20, portions of the print paper 19 and the ink ribbon 20 being shown in FIG. 1. The paper 19 is stepped upwardly and over the platen 16 at a controlled rate using an opposite pair of tractor drives 22 in conventional fashion. A ribbon system 24 of conventional configuration and which is broken away in FIG. 1 is used in conjunction with a motor 26 to drive the ribbon 20 across the paper 19 in the region of the platen 16 in well known fashion.

The tractor drives 22 are supported at the opposite ends of a rod 28 extending along the length of the printer 10 and supported by an opposite pair of mounting plates 30 and 32 mounted on a base plate 34 for the printer 10. A rod 36 of square cross-section is rotatably mounted within the mounting plates 30 and 32 to drive the tractor drives 22 and thereby effect paper advance in response to rotation of a pulley 38 coupled to the end of the rod 36. The pulley 38 is driven via a pulley 42 and a belt 44.

Figure 2:
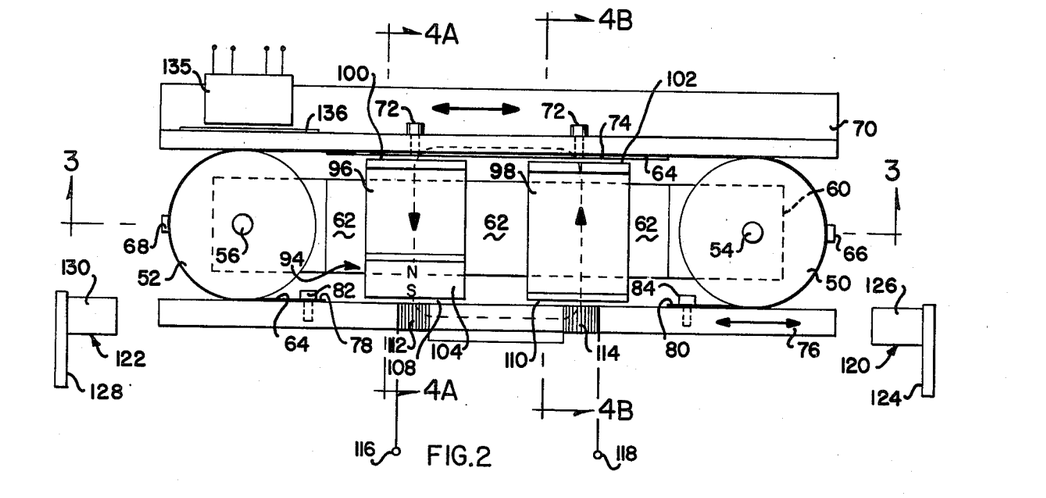
FIG. 2 is a top, plan view of a portion of the printer of FIG. 1 showing the shuttle drive.
Figure 3:
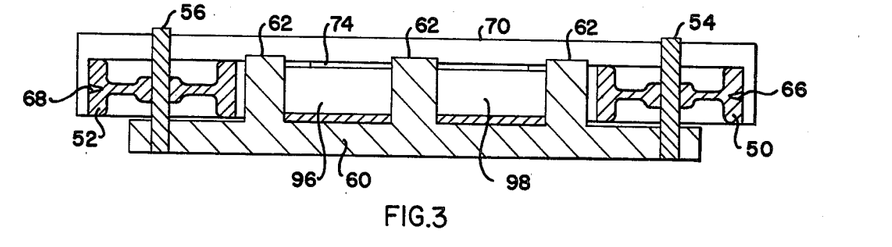
FIG. 3 is a front sectional view of the portion of the printer shown in FIG. 2 taken along the line 3—3 of FIG. 2.
Figure 4A:
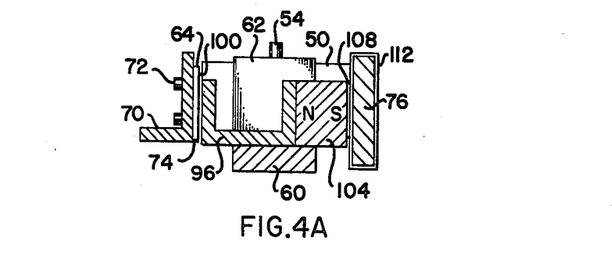
FIG. 4A is a side sectional view of the portion of FIG. 1 shown in FIG. 2 taken along the line 4A—4A of FIG. 2.
Figure 4B:
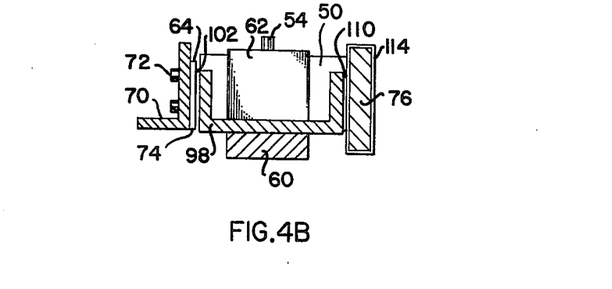
FIG. 4B is a side sectional view of the portion of FIG. 1 shown in FIG. 2 taken along the line 4B—4B of FIG. 2.

The details of the shuttle drive 12 in accordance with the invention are shown in FIGS. 2-4 as well as in FIG. 1. The shuttle drive 12 includes a pair of pulleys 50 and 52 mounted for rotation about a pair of spaced-apart, generally parallel vertical axes. The pulley 50 is mounted for rotation by a shaft 54. The pulley 52 is mounted for rotation by a shaft 56. The shafts 54 and 56 are journaled in the opposite ends of a top frame 58 and a bottom frame 60 extending along the length of the shuttle drive 12. The bottom frame 60 is mounted directly on the base plate 34 of the printer 10. The top frame 58 which is of elongated, generally rectangular configuration is shown in FIG. 1 but is omitted from FIGS. 2-4 for clarity of illustration. The top frame 58 which has the top ends of the pulley shafts 54 and 56 journaled therein is mounted on top of three intermediate frame members 62 extending vertically upwardly from the bottom frame 60 as shown in FIG. 3.

A taut band 64 of uniform width is formed into a loop which partially encircles the pulleys 50 and 52 and extends between the pulleys 50 and 52 on one side thereof as shown in FIG. 2. The band 64 which moves in response to rotation of the pulleys 50 and 52 is coupled to the pulleys 50 and 52 by screws 66 and 68 respectively. The screws 66 and 68 insure vertical registration of the band 64 with the pulleys 50 and 52 while at the same time permitting the limited movement of the band 64 necessary to reciprocate the shuttle assembly 14.

The shuttle assembly 14 is coupled to a portion of the band 64 between the pulleys 50 and 52 on one side of the pulleys 50 and 52 by a generally L-shaped frame 70. The shuttle mounting frame 70 which has a length greater than the distance between the pulley shafts 54 and 56 to provide for contact of the frame 70 with the opposite pulleys 50 and 52 through the band 64 during the limited movement undergone by the shuttle assembly 14 is coupled to the band 64 by any appropriate means. In the present example, as shown in FIG. 2, a pair of screws 72 extend through the frame 70 and through the band 64 and into a relatively thin plate 74 on the opposite side of the band 64 from the frame 70 to secure the frame 70 to the band 64.

An elongated, counterbalancing bar 76 is disposed in contact with the pulleys 50 and 52 on the opposite side of the pulleys 50 and 52 from the frame 70 and has opposite ends 78 and 80 of the band 64 secured thereto by screws 82 and 84 respectively. Like the shuttle assembly mounting frame 70, the counterbalancing bar 76 has a length greater than the distance between the pulley shafts 54 and 56 so as to remain in contact with the pulleys 50 and 52 through adjacent portions of the band 64 during the limited reciprocating movement of the shuttle assembly 14. The counterbalancing bar 76 which is similar in size and shape to the shutter assembly 14 and its included mounting frame 70 is chosen to have a mass substantially the same as that of the shuttle assembly 14 with included mounting frame 70. The counterbalancing bar 76 has been found to counterbalance the reciprocating motion of the opposite shuttle assembly 14 so as to substantially reduce vibration and shaking despite reciprocation of the shuttle assembly 14.

The shuttle mounting frame 70 has the opposite ends thereof held in contact with the pulleys 50 and 52 through adjacent portions of the band 64 by a magnet assembly 94, as shown in FIG. 2. The magnet assembly 94 also holds the opposite ends of the counterbalancing bar 76 in contact with the pulleys 50 and 52 through adjacent portions of the band 64. The magnet assembly 94 includes first and second pole pieces 96 and 98 disposed between adjacent ones of the intermediate frame members 62 and forming air gaps 100 and 102 respectively with the frame 70. The pole pieces 96 and 98 are of generally U-shaped cross-section as shown in FIGS. 4A and 4B with the piece 98 being longer than the piece 96. A permanent magnet 104 is coupled to the pole piece 96 at the end of the pole piece 96 opposite the mounting frame 70. The permanent magnet 104 has a north pole in contact with the pole piece 96 and an opposite south pole disposed adjacent and forming an air gap 108 with the counterbalancing bar 76. The end of the pole piece 98 opposite the mounting frame 70 forms an air gap 110 with the counterbalancing bar 76.

The magnet assembly 94 provides a flow of magnetic flux through a path which includes portions of the frame 70 and the counterbalancing bar 76 which are of magnetic material. The flow path for the magnetic flux is shown in dotted outline in FIG. 2. The polarity of the permanent magnet 104 is such that flux flows from the magnet 104 across the air gap 108 and into the bar 76. From that point the flux flows along the length of the bar 76 to the region of the air gap 110, where the flux crosses the gap 110 and flows into the pole piece 98 and through the air gap 102 into the frame 70. From this point, the flux flows along the length of the frame 70 to the region of the air gap 100. The flux flows across the air gap 100 and through the pole piece 96 to the permanent magnet 104 to complete the flux path. The flow of magnetic flux provided by the magnet assembly 94 exerts attractive forces on the frame 70 and the counterbalancing bar 76 which tend to pull the frame 70 toward the pole pieces 96 and 98 and the bar 76 toward the magnet 104 and the pole piece 98. Such forces hold the frame 70 and the bar 76 in contact with the opposite pulleys 50 and 52.

The pole pieces 96 and 98 and the magnet 104 form a linear motor together with a pair of coils 112 and 114. The coil 112 is wound on the counterbalancing bar 76 so as to be disposed within the air gap 108. The coil 114 is wound on the counterbalancing bar 76 so as to be disposed within the air gap 110. The coils 112 and 114 are wound on the bar 76 in opposing polarity, and one lead of each is coupled together to form a series coupling of the coils 112 and 114. The other lead of each of the coils 112 and 114 is coupled to a terminal 116 and a terminal 118 respectively, as shown in FIG. 2. The terminals 116 and 118 are coupled to receive a cyclically varying signal for driving the counterbalancing bar 76 in one direction or the other depending upon the polarity of the signal. When the signal applied to the terminals 116 and 118 causes current to flow upwardly within the portion of the coil 112 in the air gap 108 and downwardly in the portion of the coil 114 within the air gap 110, such currents interact with the flux in the gaps 108 and 110 to force the bar 76 in a direction to the right as seen in FIGS. 2 and 3. Conversely, when the signal applied to the terminals 116 and 118 reverses polarity such that current within the portion of the coil 112 in the air gap 108 flows downwardly and current in the portion of the coil 114 within the air gap 110 flows upwardly, such currents interact with the flux in the gaps 108 and 110 to produce a force on the bar 76 to move it to the left as seen in FIGS. 2 and 3. Despite the interaction of the currents in the coils 112 and 114 with the flux in the gaps 108 and 110, the flux continues to attract the frame 70 and the bar 76 with sufficient force so as to hold the frame 70 and the bar 76 tightly against the opposite pulleys 50 and 52.

Opposite limits of movement of the shuttle drive 12 are defined by a pair of stops 120 and 122 mounted adjacent the opposite ends of the counterbalancing bar 76. The stop 120 includes a generally L-shaped frame 124 mounted on the base plate 34 and having a resilient element in the form of an elastomeric block 126 mounted thereon and disposed in the path of linear movement of the bar 76. In like fashion the stop 122 includes an L-shaped frame 128 mounted on the base plate 34 and an elastomeric block 130 mounted thereon and disposed within the path of the linear motion of the bar 76. The resilient elements 126 and 130 are alternately impacted by the opposite ends of the counterbalancing bar 76 as the bar 76 reciprocates in response to energization of the coils 112 and 114. Each time one of the resilient elements 126 and 130 is impacted by an end of the bar 76, enough energy is stored in the block 126 or 130 to cause rebound to a normal driving speed with very little driving of the shuttle drive 12 being necessary. Accordingly, a circuit similar to that shown and described in the previously referred to U.S. Pat. No. 4,180,766 of Jerry Matula, can be used to energize the coils 112 and 114 of the shuttle drive 12 of the present invention. Such circuit essentially relinquishes servo control during turnaround, thereby allowing the energy stored in the compressed resilient elements 126 and 130 to do most of the work. When the shuttle drive 12 is almost up to the nominal speed, servo control is again instituted with a small amount of current being applied to the motor as necessary to maintain the nominal speed. Because the shuttle drive 12 has very low friction due to the design thereof, servo control during nominal speed is easily maintained.

The drive circuit for the coils 112 and 114 is shown in FIG. 1 in conjunction with a position encoder 131 and a direction sensor 132. The position encoder 131 can comprise any appropriate device for generating a signal which represents the speed of the hammer bank carrying shuttle assembly 14. Conventional arrangements which can be used as the position encoder 131 include an optical scanner 131$a$ which senses optically discernible marks 131$b$ along the length of the mounting frame 70 as shown in FIG. 1. FIG. 1A depicts an alternative arrangement for the position encoder 131 having a magnetic pickup 131$c$ mounted in a fixed position relative to magnetized marks 131$d$ which are disposed along the length of and which move with the frame 70. FIG. 1B depicts a further alternative arrangement for the position encoder 131 which comprises a linear tachometer 131$e$. The position encoder 131 provides a signal representing the actual velocity of the shuttle drive 12 and the included shuttle assembly 14. The signal from the encoder 131 representing shuttle velocity is amplified in an amplifier 133 prior to being applied to a velocity correction loop 134.

The direction sensor 132 which is shown combined with the position encoder 131 into a single unit 135 in FIG. 2 for sensing marks on a strip 136 extending along the length of the mounting frame 70 senses reversals of the shuttle assembly 14 by providing a bipolar signal the polarity of which reverses with each reversed direction. The direction sensor 132 can comprise any appropriate conventional arrangement for providing such a signal which is then amplified in an amplifier 137 prior to being applied to a bipolar reference signal generator 138.

The velocity signal from the amplifier 133 is applied to the velocity correction loop 134 together with a speed adjustment signal from a pulse generator 140. The velocity correction loop 134 which corresponds to the phase locked loop in the circuit in the Matula U.S. Pat.

No. 4,180,766 compares the velocity or timing signals with the speed adjustment signal. The difference in the form of a tachometer signal is applied to a summing junction 142 together with a signal from the bipolar reference signal generator 138. The bipolar reference signal generator 138 utilizes the bipolar signal from the amplifier 137 to provide a bipolar reference signal having a magnitude representing desired velocity and a polarity representing direction. The summing junction 142 combines this signal with the output of the velocity correction loop 134 to provide an error signal. The error signal is applied via a drive amplifier 144 to energize the coils 112 and 114.

Figure 5:
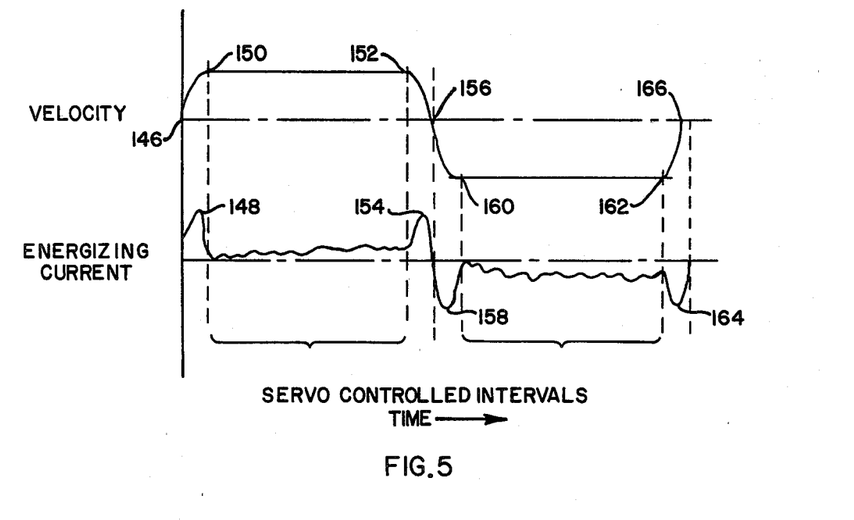
FIG. 5 comprises waveforms illustrating shuttle velocity and energizing current as a function of time.

FIG. 5 which depicts the velocity of the shuttle assembly 14 as a function of time and the corresponding energizing current which must be applied to the coils 112 and 114 to achieve the generally trapezoidal velocity characteristic corresponds to FIG. 5 of the Matula U.S. Pat. No. 4,180,766. As the velocity curve crosses zero at a point 146, the circuit of FIG. 1 responds by providing a relatively large pulse 148 to the coils 112 and 114. This pulse 148 combines with the natural rebound action of the shuttle drive 12 to quickly accelerate the shuttle drive 12 to the desired nominal velocity as determined by the velocity correction loop 134. When the shuttle drive 12 accelerates, the circuit of FIG. 1 leaves the servo saturation region and thereafter provides a current to the coils 112 and 114 as necessary to enable the shuttle drive 12 to quickly reach the nominal speed at a point 150. Thereafter, as the shuttle drive 12 undergoes linear motion in the given direction between its opposite limits, the circuit of FIG. 1 provides a relatively small amount of energizing current to the coils 112 and 114 as necessary to compensate for friction losses and the like and maintain the nominal velocity of the shuttle drive 12.

When the shuttle drive 12 has traveled far enough for the bar 76 to impact the other one of the elastomer blocks 126 and 130, which corresponds to a point 152 on the velocity curve of FIG. 5, the shuttle drive 12 rapidly decelerates. The circuit of FIG. 1 senses the resulting difference between actual and desired speed by providing an energizing current of increasing value to the coils 112 and 114. As the speed of the shuttle drive 12 decreases, the circuit provides a pulse 154 to the coils 112 and 114. The shuttle drive 12 continues to decelerate and comes to rest at a point 156 shown in FIG. 5 because of the resistance of the resilient block 126 or 130. Though the current pulse 154 opposes the deceleration of the shuttle drive 12, this energy is not wasted but rather is transferred to the resilient block 126 or 130. When the shuttle drive 12 comes to rest at the point 156 and thereafter begins to reverse direction under the action of the compressed resilient block 126 or 130, additional energy from the current pulse 154 is returned by the resilient block 126 or 130 to the shuttle drive 12. At the same time the circuit of FIG. 1 reverses polarity at the point 156 of zero motion and produces a relatively large pulse 158 so as to quickly accelerate the shuttle drive 12. As the shuttle drive 12 accelerates to the desired nominal speed, the circuit provides current to the coils 112 and 114 as determined by the actual value of the reducing error signal at the summing junction 142. As the shuttle drive 12 reaches the nominal speed represented by a point 160 on the velocity curve of FIG. 5 the energizing current provided by the circuit of FIG. 1 is reduced to relatively small values as necessary to compensate for friction losses and the like so as to maintain the linear motion of the shuttle drive 12 at the selected nominal speed.

As the shuttle drive 12 reaches its opposite limit and the bar 76 impacts the first one of the resilient blocks 126 and 130 at a point 162 shown on the velocity curve of FIG. 5, the shuttle drive 12 begins to decelerate. The circuit of FIG. 1 produces a relatively large current pulse 164. As the shuttle drive 12 decelerates to zero at a point 166 shown in FIG. 5 the circuit reverses polarity.

Figure 6:
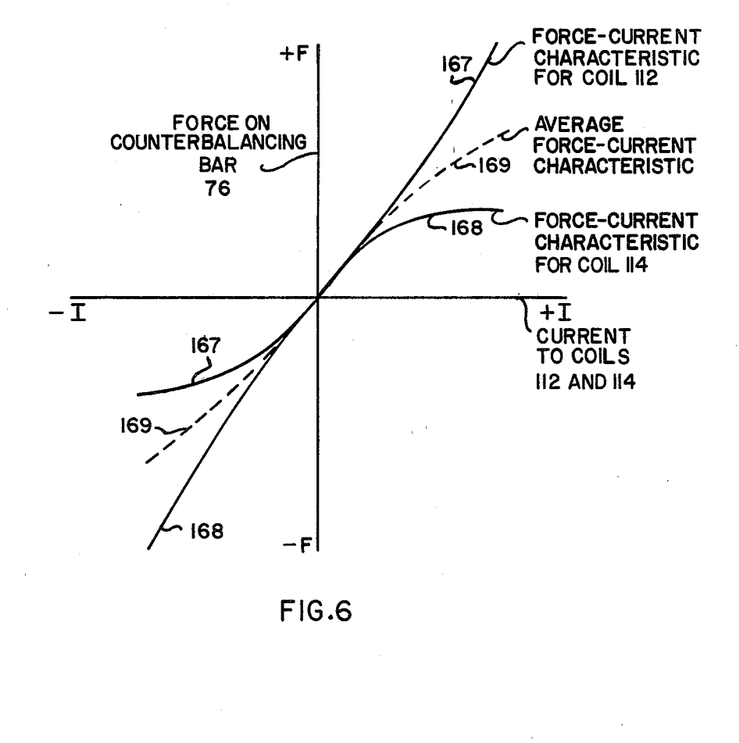
FIG. 6 comprises diagrammatic plots of driving force as a function of current useful in explaining the operation of the shuttle drive of FIGS. 1-4.

FIG. 6 is a diagrammatic plot of the force on the counterbalancing bar 76 as a function of the current in the coils 112 and 114. The upper half of FIG. 6 represents the $+F$ region in which the force on the bar 76 is in one direction. In the bottom half or $-F$ region of the plot, the force on the bar 76 is in the opposite direction. The righthand half of FIG. 6 represents a current of one polarity of $+I$, while the lefthand portion of FIG. 6 represents current of the opposite polarity or $-I$.

A first curve 167 represents the force exerted on the counterbalancing bar 76 due to current in the coil 112. It will be seen that for increasing values of positive current $+I$ applied to the coil 112, the force $+F$ in the one direction increases in an almost linear relationship with the current. However, when the current reverses polarity so as to enter the negative region $-I$ the force $-F$ produced on the bar 76 in the opposite direction increases somewhat but then tends to level off due to a saturation phenomenon common in magnetic devices. When operation is occurring in the upper righthand portion of FIG. 6 so that the current being applied to the coil 112 is positive, the resulting flux in adjacent areas of the bar 76 is of polarity opposite the flux produced by the pole pieces 96 and 98 and the magnet 104. However, in the lower lefthand region of FIG. 6 where the current is negative, the two different fluxes in the bar 76 combine to produce magnetic saturation which results in the leveling off of the curve 167.

A curve 168 which is a plot of force on the counterbalancing bar 76 as a function of current in the coil 114 is the reverse of the curve 167 because of the fact that the coil 114 is out-of-phase with the coil 112. Thus, when the current to the coil 114 is negative ($-I$), the curve 168 is within a substantially linear region as shown in FIG. 6. However, when the current in the coil 114 becomes positive ($+I$), then the characteristic tends to level off with increasing values of current due to the saturation phenomenon. A dotted line curve 169 represents the combined effect of the two different coils 112 and 114. Thus, when the bar 76 in the region of one of the coils 112 and 114 is saturated due to the polarity of the current, the area of the bar 76 adjacent the other coil 112 or 114 is unsaturated, and vice versa. While the curve 169 is not an ideal straight line, it is a substantial improvement over the asymmetrical operation afforded by a single coil of given polarity.

Figure 7:
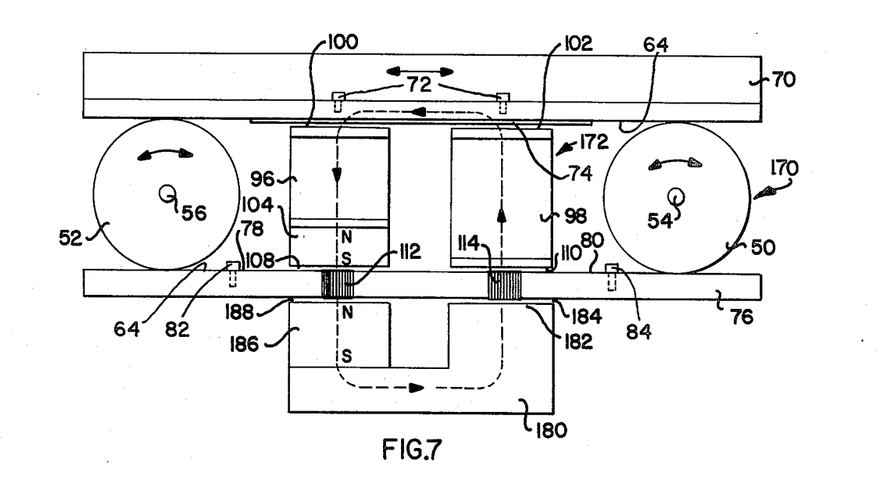
FIG. 7 is a top, plan view of an alternative arrangement of a shuttle drive in accordance with the invention.

FIG. 7 depicts an alternative shuttle drive 170 in accordance with the invention. The shuttle drive 170 in FIG. 7 is identical to the shuttle drive 12 shown in FIGS. 2-4 except for the magnet assembly. The shuttle drive 170 of FIG. 7 employs a magnet assembly 172 which is like the magnet assembly 94 of the shuttle drive 12 of FIGS. 2-4 in its use of the pole piece 96 and the permanent magnet 104 which respectively form the air gap 100 with the frame 70 and the air gap 108 with the counterbalancing bar 76. The magnet assembly 172 of FIG. 7 is also like the magnet assembly 94 of the shuttle drive 12 of FIGS. 2-4 in its use of the pole piece 98 which forms the air gap 102 with the mounting frame 70 and the air gap 110 with the counterbalancing bar 76. The magnet assembly 172 also includes a third pole piece 180 disposed on the outside of the counterbalancing bar 76 opposite the magnet 104 and the pole piece 98. The pole piece 180 has a tip 182 forming an air gap 184 with the bar 76 opposite the pole piece 98 and the air gap 110. Coupled to the opposite end of the pole piece 180 from the tip 182 is a permanent magnet 186 disposed adjacent and forming an air gap 188 with the counterbalancing bar 76 opposite the magnet 104 and the air gap 108. The magnet 186 has a north pole adjacent the counterbalancing bar 76 and a south pole opposite the bar 76 so as to reinforce the magnetic flux produced by the magnet 104.

The shuttle drive 170 of FIG. 7 has the advantage over the shuttle drive 12 of FIGS. 2-4 that both sides of each of the coils 112 and 114 are used, thereby making the operation of the linear motor more efficient. Thus, the coil 112 interacts with flux in the air gap 188 as well as in the air gap 108. Similarly the coil 114 interacts with flux in the air gap 184 as well as in the air gap 110. For a given amount of current applied to the coils 112 and 114, the use of both sides of each coil 112 and 114 provided by the arrangement of FIG. 7 results in a greater driving force being exerted on the counterbalancing bar 76. Conversely, the shuttle drive 170 of FIG. 7 is disadvantageous relative to the shuttle drive 12 of FIGS. 2-4 in that the presence of gaps 108, 110, 184 and 188 on both sides of the bar 76 reduces or eliminates the attractive force on the bar 76 which holds the bar 76 against the pulleys 50 and 52. Forces are created within the air gaps 184 and 188 tending to pull the bar 76 away from the pulleys 50 and 52. Therefore, if the air gap 188 is approximately equal in size to the air gap 108 and if the air gap 184 is approximately equal in size to the air gap 110, the attractive forces exerted on the opposite sides of the counterbalancing bar 76 are approximately equal. To provide at least some attractive force on the counterbalancing bar in the direction to hold the bar 76 against the pulleys 50 and 52, the air gap 184 is preferably larger than the air gap 110 and the air gap 188 is preferably larger than the air gap 108. The larger the gaps 184 and 188 relative to the gaps 110 and 108, the greater will be the attracting force that maintains the counterbalancing bar 76 against the pulleys 50 and 52 and the less is the effect of the portions of the coils 112 and 114 within the gaps 184 and 188. Experimentation will produce a workable compromise between the increase in attractive force and the decrease in driving force on the bar 76 as the air gaps 184 and 188 are made larger.

Efficiency of operation is also generally dependent on the number of coils located in the various air gaps. Thus, in the four gap arrangements described herein as few as one and as many as four coils can be used. For example, in the embodiment of FIGS. 2-4, a coil can also be located in each of the gaps 100 and 102 or in either of them in addition to the coils 112 and 114.

In the shuttle drive 12 of FIGS. 2-4 the band 64 is taut throughout its entire length between the opposite ends 78 and 80 thereof which are fixedly attached to the counterbalancing bar 76. Tautness of the band 64 can be varied somewhat by adjusting the position of one of the ends 78 and 80 along the counterbalancing bar 76.

It may be desirable for some applications to provide some resiliency within the band 64 to compensate for tolerances, thermal expansion and the like. However, if resiliency is introduced into the band 64, then upon impact and rebound from the resilient blocks 126 and 130 a substantial amount of play or tolerance is created between the counterbalancing bar 76 and the pulleys 50 and 52. Excessive tolerance or play may make the shuttle drive 12 difficult to servo control or in any event may affect the desired trapezoidal velocity function of the shuttle drive 12.

Figure 8:
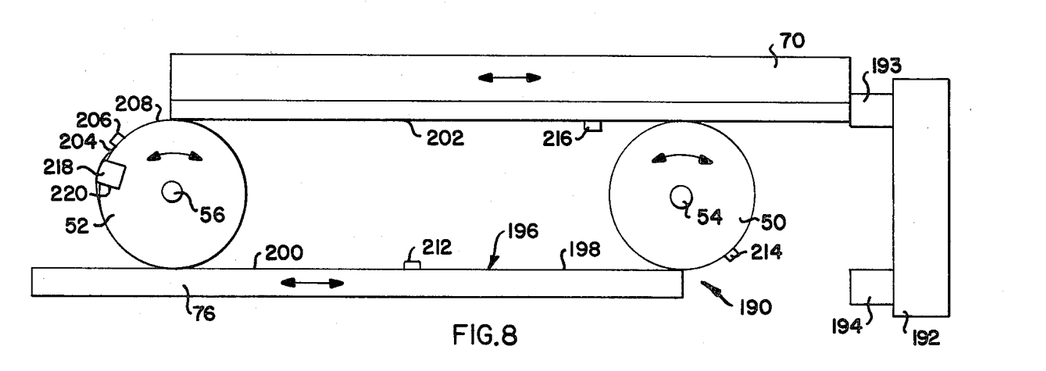
FIG. 8 is a top, plan view of a further alternative arrangement of a shuttle drive in accordance with the invention.

FIG. 8 depicts an alternative shuttle drive 190. The shuttle drive 190 of FIG. 8 is identical to the shuttle drive 12 of FIGS. 2-4 except for the rebounding mechanism and the band arrangement. The rebounding mechanism consists of a mounting frame 192 having opposite ends disposed within the paths of linear motion of the frame 70 and the counterbalancing bar 76 and mounting resilient blocks 193 and 194 respectively. The band arrangement in the shuttle drive 190 includes a band 196 having an integral, continuous central portion 198 and a pair of opposite end portions 200 and 202. The end portion 200 of the band 196 terminates at an end 204 thereof secured to the pulley 52 by a screwn 206. The end portion 202 of the band 196 terminates at an end 208 thereof also secured to the pulley 52 by the screw 206 so as to overlap the first end 204. The band 196 is secured to the counterbalancing bar 76 by a screw 212, to the pulley 50 by a screw 214 and to the frame 70 by a screw 216. The central portion 198 of the band 196 extends from the screw 212 around the pulley 50 past the screw 214 to the screw 216. The end portion 200 of the band 196 extends from the screw 212 around the pulley 52 to the screw 206. Just prior to reaching the screw 206 the end portion 200 of the band 196 extends over a resilient element 218 which is seated within a slot 220 in the outer surface of the pulley 52. The end portion 202 of the band 196 extends from the screw 216 to the screw 206.

The resilient element 218 which normally extends outwardly a short distance from the outer surface of the pulley 52 allows movement of the adjacent portion of the band 196 toward and away from the outer surface of the pulley 52 so as to vary the band lengths as tension on the band 196 varies. This compensates for tolerances, thermal expansion and the like. At the same time the central portion 198 of the band 196 which extends around the pulley 50 between the screws 212 and 216 and which is tensioned by rebounds of the frame 70 and the counterbalancing bar 76 from the resilient blocks 193 and 194 remains taut and is isolated from the resiliency provided by the resilient element 218.

Figure 9:
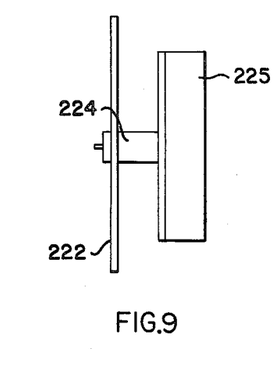
FIG. 9 is a top, plan view of an alternative rebounding mechanism.

FIG. 9 shows an alternative arrangement of a rebounding mechanism which may be used in place of the mounting frame 192 and the resilient blocks 193 and 194 shown in FIG. 8. The arrangement of FIG. 9 utilizes a single leaf spring 222 having opposite ends disposed within the paths of linear motion of the frame 70 and the counterbalancing bar 76. The spring 222 is mounted at a central portion thereof by a mounting bracket 224 secured to a mounting frame 225 so that the opposite ends thereof are free to flex in response to compacting and rebound by the frame 70 and the bar 76.

Figure 10:
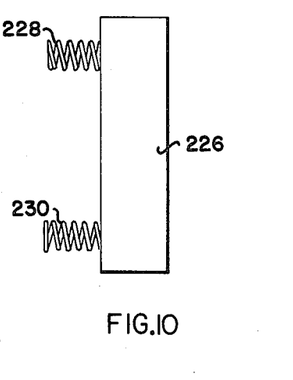
FIG. 10 is a top, plan view of a further alternative rebounding mechanism.

FIG. 10 shows a further alternative arrangement of a rebounding mechanism which can be used in place of the mounting frame 192 and the resilient blocks 193 and 194 in FIG. 8. The arrangement of FIG. 10 employs a mounting frame 226 similar to the mounting frame 192 of FIG. 7. However, instead of the resilient blocks 193 and 194, the frame 226 has a pair of coil springs 228 and 230 mounted on the opposite ends thereof. The coil spring 228 is positioned to be impacted by the frame 70 and the coil spring 230 is positioned to be impacted by the counterbalancing bar 76.

The lengths of the coils 112 and 114 along the length of the counterbalancing bar 76 and the lengths of the magnet 104 and the pole piece 98 along the air gaps 108 and 110 are preferably chosen in relation to the length of the stroke of the shuttle drive 12 so that no portion of the coils 112 and 114 extends beyond the opposite edges of the magnet 104 and the pole piece 98 respectively. In this manner interaction of the coils 112 and 114 with the magnetic flux from the magnet 104 is optimized and operation remains within an essentially linear range.

Shuttle drives in accordance with the invention such as the shuttle drive 12 have been found capable of operating at relatively high speeds while at the same time requiring relatively small amounts of power to the coils such as the coils 112 and 114 of FIG. 1. In one arrangement constructed and successfully tested in accordance with the invention, coil power of no more than about 5 watts drives the shuttle assembly such as the shuttle assembly 14 through a stroke of 0.8 inch at a speed of 50 milliseconds per stroke. The 50 milliseconds required by each stroke is comprised of 38 milliseconds of printing and 12 milliseconds of turnaround at opposite ends of the stroke. Each line of characters requires 8 strokes, and the printer 10 is capable of printing up to 150 lines per minute. It will be understood that such figures are given by way of example only and that other printer speeds on the order of 300 lines per minute and greater are possible using shuttle drives such as the shuttle drive 12 in accordance with the invention.

Figure 11:
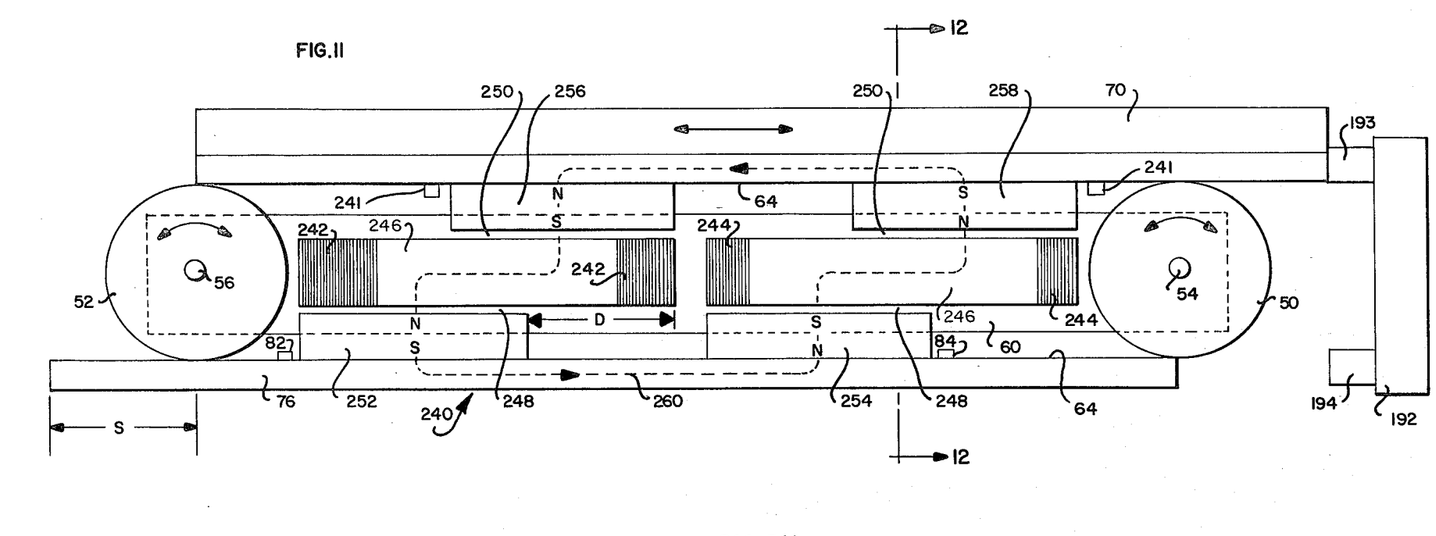
FIG. 11 is a top, plan view of a further alternative arrangement of a shuttle drive in accordance with the invention.

FIG. 11 depicts an alternative shuttle drive 240. The shuttle drive 240 of FIG. 11 is similar to the shuttle drive 12 of FIGS. 2-4 in that it employs the pulleys 50 and 52 mounted on shafts 54 and 56 journaled in the bottom frame 60, the band 64, and the shuttle assembly mounting frame 70 and the counterbalancing bar 76 disposed on opposite sides of the pulleys 50 and 52. In the embodiment of FIG. 11 the band 64 is coupled to the counterbalancing bar 76 by the screws 82 and 84 and to the frame 70 by screws 241. The shuttle drive 240 of FIG. 11 also employs the rebounding mechanism of FIG. 8 including the mounting frame 192 and the resilient blocks 193 and 194.

The shuttle drive 240 of FIG. 11 differs from the prior arrangements in that it employs coils 242 and 244 which are stationary and magnets 252, 254, 256 and 258 which are mounted on and which move with the mounting frame 70 and the counterbalancing bar 76. A first coil 242 and a second coil 244 are mounted on the bottom frame 60 between the opposite pulleys 50 and 52 so as to be disposed generally equidistantly from the mounting frame 70 and the counterbalancing bar 76. The coils 242 and 244 are of generally elongated configuration, and each comprises a length of wire wrapped around an elongated form 246 of generally rectangular cross-sectional shape. The width of the form 246 is substantially less than the height thereof so as to dispose a large portion of each turn of the wire forming the coil 242 or 244 within one or the other of a pair of air gaps 248 and 250 on opposite sides of each coil 242 and 244. The air gaps 248 are formed by the coils 242 and 244 and a first pair of permanent magnets 252 and 254 mounted in spaced-apart relation along the length of the counterbalancing bar 76 at the inside surface thereof. The permanent magnet 252 is disposed adjacent the first coil 242, while the permanent magnet 254 is disposed adjacent the second coil 244. The air gaps 250 are formed by the coils 242 and 244 with a second pair of permanent magnets 256 and 258 mounted in spaced-apart relation along the length of the mounting frame 70 at the inside surface thereof. The permanent magnet 256 is disposed adjacent the first coil 242, while the permanent magnet 258 is disposed adjacent the second coil 244.

Figure 12:
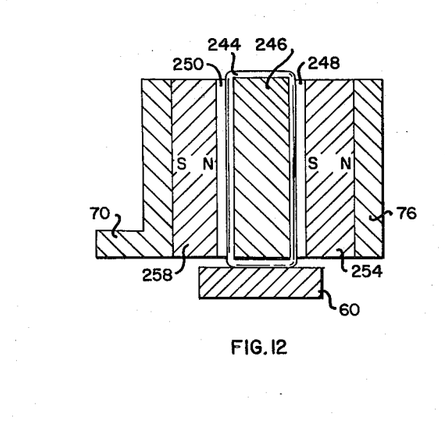
FIG. 12 is a side sectional view of the arrangement of FIG. 11 taken along the line 12—12 of FIG. 11.

The polarity of the permanent magnets 252, 254, 256 and 258 is as shown in FIGS. 11 and 12. This provides a flow of magnetic flux as shown by a dotted line 260 in FIG. 11. Flux from the permanent magnet 252 flows along the length of the counterbalancing bar 76 to the permanent magnet 254 where it flows through the permanent magnet 254 and the gap 248 to the second coil 244. From the second coil 244 the flux flows through the gap 250 and through the permanent magnet 258 to the mounting frame 70. The flux flows along the length of the mounting frame 70 and into the permanent magnet 256. From the permanent magnet 256 the flux flows through the air gap 250, through the first coil 242 and through the air gap 248 to the permanent magnet 252 to complete the flux path.

The coils 242 and 244 are serially wired together in opposite polarity and are coupled to be energized by an alternating signal in the manner previously described in connection with prior embodiments to provide the desired reciprocating motion of the shuttle drive 240. Reversals of current in the first coil 242 have the effect of driving the permanent magnets 252 and 256 in opposite directions along the length of the coil 242. Similarly, reversals of current in the coil 244 drive the permanent magnets 254 and 258 in opposite directions along the length of the coil 244. At the same time the permanent magnets 252, 254, 256 and 258 are attracted toward the coils 242 and 244 so as to hold the counterbalancing bar 76 and the mounting frame 70 in contact with the pulleys 50 and 52.

The shuttle drive 240 of FIGS. 11 and 12 provides an advantage over the shuttle drives 12, 170 and 190 previously discussed in the form of larger portions of the coils 242 and 244 being placed in the active magnetic gaps 248 and 250 so as to increase the efficiency of operation. This can be appreciated from FIG. 12 which illustrates the large side portions of the turns of the coil 244 being disposed in the gaps 248 and 250. By the same token there are certain features of the arrangement of FIGS. 11 and 12 which may render the arrangement less advantageous than prior arrangements in certain applications. These include the fact that relatively high mass permanent magnets 252, 254, 256, and 258 are mounted on the counterbalancing bar 76 and the mounting frame 70 instead of the low mass coils 242 and 244. Also, because the permanent magnets 252, 254, 256 and 258 which are attracted to the coils 242 and 244 are constantly changing position relative to the opposite pulleys 50 and 52 as the bar 76 and the frame 70 reciprocate, the bending moments exerted on the bar 76 and the frame 70 continually change rather than remaining constant as in the case of the prior shuttle drives 12, 170, and 190.

To insure linear operation at high efficiency, the shuttle drive 240 of FIGS. 11 and 12 is preferably designed so that all portions of each of the permanent magnets 252, 254, 256 and 258 are disposed opposite a coil 242 or 244 for all positions of the counterbalancing bar 76 and the mounting frame 70. Thus the permanent magnet 252 has all portions thereof disposed opposite the first coil 242 for the various different positions of the counterbalancing bar 76. Likewise the permanent magnet 256 has all portions thereof disposed opposite the first coil 242 for the various different positions of the mounting frame 70. Similar considerations apply to the permanent magnets 254 and 258 with respect to the second coil 244. This is achieved by designing the shuttle drive 240 so that the length of the stroke of movement of the bar 76 and the frame 70 is no greater than the difference between the length of each permanent magnet 252, 254, 256, and 258 and the length of the adjacent coil 242 or 244. In the case of the shuttle drive 240 shown in FIG. 11 the difference between the length of the permanent magnet 252 and the first coil 242, expressed as D, is made approximately equal to the stroke, expressed as S. Thus, linear operation throughout the entire range of motion of the shuttle drive 240 is insured without making either the permanent magnets 252, 254, 256, and 258 or the coils 242 and 244 longer than necessary.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for bidirectionally driving a hammer bank shuttle assembly along a linear path comprising the combination of:
   a pair of opposite rotatable elements;
   a first elongated element forming a hammer bank shuttle assembly mounting element and extending between and disposed adjacent each of the pair of opposite rotatable elements on one side of the rotatable elements;
   a second elongated element forming a counterbalancing element and extending between and disposed adjacent each of the pair of opposite rotatable elements on the opposite side of the rotatable elements from said one side;
   means including at least one pole piece disposed adjacent one of the first and second elongated elements for providing a flow of magnetic flux between the pole piece and said one of the first and second elongated elements;
   a coil mounted on said one of the first and second elongated elements adjacent the pole piece; and
   means for providing to the coil a cyclically varying signal to reciprocate said one of the first and second elongated elements in opposite directions through a path of linear movement.

2. The invention set forth in claim 1, wherein the means for providing a flow of magnetic flux includes means disposed between the first and second elongated elements for magnetically attracting the first and second elongated elements toward the pair of opposite rotatable elements.

3. The invention set forth in claim 1, wherein the means for providing a flow of magnetic flux includes a pair of spaced-apart pole pieces extending between the first and second elongated elements.

4. The invention set forth in claim 3, wherein one of the pole pieces has a permanent magnet coupled thereto and the coil comprises a pair of coils, each disposed adjacent a different one of the pole pieces.

5. A linear motor arrangement comprising the combination of an element of magnetic material, means mounting the element of magnetic material to provide reciprocating linear motion of the element of magnetic material along a path of movement, a magnetic circuit having a first pair of spaced-apart pole pieces disposed adjacent the element of magnetic material, means coupled to the magnetic circuit for providing a flow of magnetic flux through a first one of the first pair of spaced-apart pole pieces, a pair of coils mounted on the element of magnetic material and each being disposed adjacent a different one of the first pair of spaced-apart pole pieces, means defining opposite limits of the linear motion of the element of magnetic material and disposed to be impacted each time the element of magnetic material reaches one of the opposite limits of the linear motion, a member of magnetic material having a second pair of spaced-apart pole pieces disposed adjacent the element of magnetic material with each of the second pair of spaced-apart pole pieces being disposed on an opposite side of the element of magnetic material from a different one of the first pair of pole pieces, and wherein the means for providing a flow of magnetic flux includes a pair of permanent magnets disposed on opposite sides of the element of magnetic material, one of the permanent magnets being coupled to one of the first pair of pole pieces and the other one of the permanent magnets being coupled to one of the second pair of pole pieces.

6. A linear motor arrangement comprising the combination of:
   a pair of spaced-apart rotatable elements;
   an elongated element extending between and disposed adjacent the rotatable elements;
   magnetic pole piece means disposed adjacent and forming an air gap with the elongated element on the same side of the elongated element as the rotatable elements;
   magnet means coupled to the pole piece means to magnetically attract the elongated element toward the pole piece means to hold the elongated element adjacent each of the pair of spaced-apart rotatable elements;
   a coil mounted on the elongated element within the air gap; and
   means for applying a current to the coil to reciprocate the elongated element and rotate the pair of spaced-apart rotatable elements.

7. An arrangement for bidirectionally driving a printing mechanism relative to a printable medium in a line printer comprising the combination of:
   a pair of circular elements mounted in spaced-apart relation for rotation about a pair of generally parallel axes;
   an elongated printing mechanism including a mounting element of magnetic material extending between the circular elements on one side of the circular elements;
   an elongated counterbalancing element of magnetic material extending between the circular elements on the other side of the circular elements;
   a first pole piece disposed between the pair of circular elements and forming an air gap with the elongated printing mechanism;
   a magnet coupled to a portion of the first pole piece opposite the elongated printing mechanism and forming an air gap with the counterbalancing element;
   a second pole piece disposed between the pair of circular elements and spaced-apart from the first pole piece, the second pole piece forming air gaps with the elongated printing mechanism and the counterbalancing element;

a first coil mounted on the counterbalancing element and disposed within the air gap formed by the magnet with the counterbalancing element; and a second coil mounted on the counterbalancing element and disposed within the air gap formed by the second pole piece with the counterbalancing element.

8. The invention set forth in claim 7, further including a thin, flexible band of generally uniform width formed into a loop encircling a portion of each of the pair of circular elements and being coupled to the elongated mounting element of the printing mechanism and the counterbalancing element.

9. The invention set forth in claim 8, wherein the band includes a continuous portion thereof fastened to a first one of the pair of circular elements and to the mounting element of the elongated printing mechanism and the counterbalancing element, a pair of end portions at the opposite ends of the continuous portion, each of the opposite end portions being fastened to a second one of the pair of circular elements and resilient means providing variation in the length of at least one of the opposite end portions between the continous portion and the location at which the at least one of the opposite end portions is fastened to the second one of the pair of circular elements, and further including resilient members disposed adjacent the first one of the pair of circular elements and defining opposite limits of movement for the elongated printing mechanism and the counterbalancing element.

10. The invention set forth in claim 7, further comprising means for applying a signal of alternating polarity to the first and second coils.

11. The invention set forth in claim 10, wherein the magnet has a south pole facing the counterbalancing element and the first and second coils are wound in opposite polarities around the counterbalancing element and are coupled in series.

12. The invention set forth in claim 10, further comprising a resilient stop arrangement disposed to define opposite limits of movement for the elongated printing mechanism and the counterbalancing element.

13. The invention set forth in claim 12, wherein the resilient stop arrangement includes first and second blocks of resilient material fixedly mounted adjacent the opposite ends of the counterbalancing element.

14. The invention set forth in claim 12, wherein the means for applying the signal of alternating polarity is operative to reverse the polarity of the signal each time the elongated printing mechanism and the counterbalancing element reach an opposite limit of movement.

15. The invention set forth in claim 14, wherein the means for applying the signal of alternating polarity includes means for sensing the actual velocity of the printing mechanism of the counterbalancing element, means for providing a representation of desired velocity for the elongated printing mechanism and the counterbalancing element and means responsive to the actual velocity of the elongated printing mechanism and the counterbalancing element and to the representation of desired velocity for the elongated printing mechanism and the counterbalancing element for varying the signal of alternating polarity in accordance with any difference between the actual velocity and the representation of desired velocity.

16. An arrangement for bidirectionally driving a printing mechanism relative to a printable medium in a line printer comprising the combination of:

a pair of circular elements mounted in spaced-apart relation for rotation about a pair of generally parallel axes;

an elongated printing mechanism including a mounting element of magnetic material extending between the circular elements on one side of the circular elements;

an elongated counterbalancing element of magnetic material extending between the circular elements on the other side of the circular elements;

a first pole piece disposed between the pair of circular elements and forming an air gap with the mounting element of the elongated printing mechanism;

a first magnet coupled to a portion of the first pole piece opposite the elongated printing mechanism and forming a first air gap with the counterbalancing element;

a second pole piece disposed between the pair of circular elements and spaced-apart from the first pole piece, the second pole piece forming an air gap with the mounting element of the elongated printing mechanism and a second air gap with the counterbalancing element;

a third pole piece disposed on the opposite side of the counterbalancing element from the first and second pole pieces, the third pole piece having a first end thereof forming a third air gap with the counterbalancing element opposite the second air gap;

a second magnet coupled to a second end of the third pole piece opposite the first end of the third pole piece and forming a fourth air gap with the counterbalancing bar opposite the first air gap;

a first coil mounted on the counterbalancing element and disposed within the first and fourth air gaps, and a second coil mounted on the counterbalancing element and disposed within the second and third air gaps.

17. The invention set forth in claim 16, wherein the first and second air gaps are approximately equal in size and the third and fourth air gaps are approximately equal in size and are longer than the first and second air gaps.

18. A linear motor arrangement comprising the combination of:

a pair of opposite rotatable elements;

first and second elongated elements extending between the pair of opposite rotatable elements on opposite sides of the pair of opposite rotatable elements, each of the first and second elongated elements undergoing linear motion along a different path of movement upon rotation of the pair of opposite rotatable elements;

a resilient stop mechanism disposed adjacent a first one of the pair of opposite rotatable elements and extending into the different path of movement for each of the first and second elongated elements;

a band having an integral central portion between an opposite pair of end portions, the central portion of the band extending around and being attached at a first location to the first one of the pair of opposite rotatable elements, the central portion of the band being attached at a second location to the first elongated element and being attached at a third location to the second elongated element, a first one of the opposite pair of end portions extending from the second location at least partly around and being attached to the second one of the pair of opposite rotatable elements and the second one of the opposite pair of end portions extending from the third location at least partly around and being attached to the second one of the pair of opposite rotatable elements;

a resilient element mounted within the second one of the pair of opposite rotatable elements and extending into contact with one of the opposite pair of end portions of the band; and means for bidirectionally driving the pair of opposite rotatable elements and the first and second elongated elements to reciprocate the first and second elongated elements along the different paths of movement therefor.

19. An arrangement for bidirectionally driving a hammer bank shuttle assembly along a linear path comprising the combination of:

a pair of opposite rotatable elements;

a first elongated element forming a hammer bank shuttle assembly mounting element and extending between and adjacent each of the pair of opposite rotatable elements on one side of the rotatable elements;

a second elongated element forming a counterbalancing element and extending between and adjacent each of the pair of opposite rotatable elements on the opposite side of the rotatable elements from said one side;

a first magnetic member disposed adjacent one of the first and second elongated elements;

a second magnetic member mounted on said one of the first and second elongated elements; and means for providing to one of the first and second magnetic members a cyclically varying signal to cause the first and second magnetic members to magnetically interact and provide reciprocation of the first and second elongated elements in opposite directions through a path of linear movement.

20. The invention set forth in claim 19, wherein the first magnetic member is disposed between the first and second elongated elements, there is a third magnetic member disposed between the first and second elongated elements and spaced apart from and forming a first group of magnetic members with the first magnetic member, the second magnetic member is mounted on the first elongated element adjacent the first magnetic member, there is a fourth magnetic member mounted on the first elongated element adjacent the third magnetic member, a fifth magnetic member mounted on the second elongated element adjacent the first magnetic member and a sixth magnetic member mounted on the second elongated element adjacent the third magnetic member, the second, fourth, fifth and sixth magnetic members forming a second group of magnetic members, and the means for providing a cylically varying signal is operative to provide the cyclically varying signal to one of the first and second groups of magnetic members.

21. The invention set forth in claim 20, wherein said one of the first and second groups of magnetic members is comprised of coils and the other one of the first and second groups of magnetic members is comprised of permanent magnets.

22. A linear motor arrangement comprising the combination of:

a pair of spaced-apart rotatable elements;

an elongated element extending between and disposed adjacent the rotatable elements;

first and second magnets mounted in spaced-apart relation along the length of the elongated element;

first and second coils disposed adjacent and forming air gaps with the first and second magnets respectively; and means for applying to the first and second coils a cyclically varying signal to reciprocate the elongated element in opposite directions through a path of linear movement.

23. The invention set forth in claim 22, wherein the elongated element comprises a first elongated element and further including a second elongated element extending between and disposed in contact with the rotatable elements on the opposite side of the rotatable elements from the first elongated element and third and fourth magnets mounted in spaced-apart relation along the length of the second elongated element, the third and fourth magnets being disposed adjacent and forming air gaps with the first and second coils respectively.

* * * * *